US005675495A

United States Patent [19]

Biermann et al.

[11] Patent Number: 5,675,495

[45] Date of Patent: Oct. 7, 1997

[54] PROCESS FOR THE DESIGN OF FREE FORM REFLECTORS WHICH ACCOUNTS FOR MANUFACTURING TOLERANCES

[75] Inventors: Gerhard Biermann, Paderborn, Germany; Douglas Frederick Kreysar, West Bloomfield; Ben Wang, Farmington, both of Mich.

[73] Assignee: Hella K.G. Hueck & Co., Lippstadt, Germany

[21] Appl. No.: 444,095

[22] Filed: May 18, 1995

[51] Int. Cl.[6] ............................ G06F 19/00; G06G 7/64; G06G 7/66

[52] U.S. Cl. ...................................... 364/468.03; 362/297

[58] Field of Search .................................... 364/468, 578, 364/525, 495; 395/118–166

[56] References Cited

U.S. PATENT DOCUMENTS 5,204,820 4/1993 Strobel et al. .......................... 364/468

5,225,892 7/1993 Matsugu et al. ........................ 356/401

5,500,732 3/1996 Ebel et al. .............................. 356/124

*Primary Examiner*—Reba I. Elmore
*Assistant Examiner*—Monica Lewis
*Attorney, Agent, or Firm*—Dickinson, Wright, Moon, Van Dusen & Freeman

[57] ABSTRACT

A process for computer-assisted-design of an optical element allows for anticipation of errors that may arise in the actual manufacture of the element. A known optical design program is first operated to determine data representing the physical characteristics of the element that will provide a desired optical output. Then, the data representing the optimum physical characteristics are modified in accordance with a statistical distribution that represents the errors in the physical elements that are expected in the actual manufacture of the physical elements. The optical output is then determined for an optical element having the modified physical characteristics. This modified optical output is compared with the desired optical output to determine whether the designed optical element will produce the desired optical output when manufactured.

14 Claims, 2 Drawing Sheets

PROCESS FOR THE DESIGN OF FREE FORM REFLECTORS WHICH ACCOUNTS FOR MANUFACTURING TOLERANCES

TECHNICAL FIELD

This invention relates to the art of computer assisted design of optical elements. In particular, the invention relates to the computer assisted design of free form reflectors.

BACKGROUND

Computer assisted design of optical elements is known. Various computer programs for this purpose are known, and these programs typically calculate images or light patterns for optical elements that are mathematically defined. A known technique for such calculation is ray tracing. In accordance with this technique, a program assumes various input light rays, calculates the effect of the optical element on the rays, and displays the resulting light pattern. Such a program allows an optical designer to optimize the shape or other optical parameters of the element prior to manufacture of a prototype element.

Styling and performance requirements now often demand automotive lamps with clear cover glasses. In these lamps, the reflector is the only element used to control the output light distribution. These lamps may be designed with clear lenses by implementing Free-Form Reflectors (FFR) into the lamp system. A FFK contains mathematically-computed reflector surface that achieve the desired light distribution (also referred to as beam pattern or photometric result) with or without refracting optical elements in front of them. The high demand for lamps utilizing FFRs and the demand for reduced design lead-time have created a heavy dependence on computer aided lighting design and analysis tools.

The difference between the performance predicted by a computer design program and the actual performance of a manufactured part can be unacceptably high. In the specific field of FFK design for a United States automotive low beam headlamp, for example, this difference can result in difficulty meeting federal glare light requirements. The differences between expected and actual performances are mainly the result of manufacturing errors that arise naturally from the manufacturing process. It is extremely expensive to manufacture a part corresponding to the computer's mathematical data at high levels of accuracy. A successful design, therefore, should achieve an acceptable beam pattern at large hardware tolerance levels, so that hardware build costs and times are minimized.

SUMMARY OF THE INVENTION

Efficient design and manufacture of optical elements requires a high degree of agreement between the photometric result of computer simulations and the light pattern produced by the manufactured product. This high level of agreement can be obtained by a process in accordance with the invention, which explicitly takes into account expected, random manufacturing variations in the optical power of discrete parts of the optical element. The new computer-assisted design process yields a new surface whose computer simulated photometric result more closely resembles the photometric result of manufactured products than the photometric results of a manufactured product in accordance with the original surface.

In accordance with the invention, expected manufacturing errors are taken into account by adding a step to the known design process whereby optical parameters of the originally-optimized optical element are modified, or perturbed, during the computer design phase to simulate errors expected to arise during manufacture. Computer simulation of the light pattern is then performed using the perturbed parameters. In the preferred embodiment, the optical element is a reflector that is defined by the shape of its surface. To perturb the reflector, the surface is made into a finite element mesh, which consists of a set of coordinate points $(x_i, y_i, z_i)$. The points in the mesh are then moved or "perturbed" in the x and/or y and/or z directions by adding random values $\Delta x$ and/or $\Delta y$ and/or $\Delta z$ respectively to the mesh points to provide a random optical power differential. The new reflector mesh is then made up of points having modified positions $(x_i+\Delta x_i y_i+\Delta y_i, z_i+\Delta z_i)$.

Each $\Delta x$, $\Delta y$, and $\Delta z$ is determined by a random number generated by the computer such that $$\Delta_{min} \leqq \Delta \leqq \Delta_{max}$$

where $\Delta_{min}$ and $\Delta_{max}$ are the tolerance parameters and are entered by the design engineer. These tolerances correspond to the those of the particular manufacturing process. The probability function used to generate the A values is preferably such that all values are equally probable. Of course, other probability functions may be used if the particular manufacturing process indicates such.

From the new reflector mesh, new "smoothed" reflector surfaces are created, which will differ from the original surfaces. The new surfaces are then used in photometric simulation software ray trace routines to generate simulated photometric results for the part. The new simulation result is then studied, and if deemed unsatisfactory, new element parameters are developed, and the design process continues. If the results are satisfactory, a prototype part is produced.

Three assumptions are typically made in the preferred embodiment of this perturbation process. First, it is assumed that the errors affecting the beam pattern occur randomly, meaning that no specific area on the reflector has higher manufacturing error than any other. For example, errors arising by handwork, tool deflection, vibration, poor metalization, etc., affect all areas of the reflector equally and randomly. Second, it is assumed that errors in the product are "smoothed" or continuous due to polishing of the tool, base-coating, etc. Third, it is assumed that the errors occur with a probability distribution whereby the probability of occurrence is equal for all values within the range of the perturbation. Other assumptions may result in different distributions of the perturbations, depending on the particular circumstances.

DETAILED DESCRIPTION OF THE PREFERRED EMBODIMENT

Figure 1:
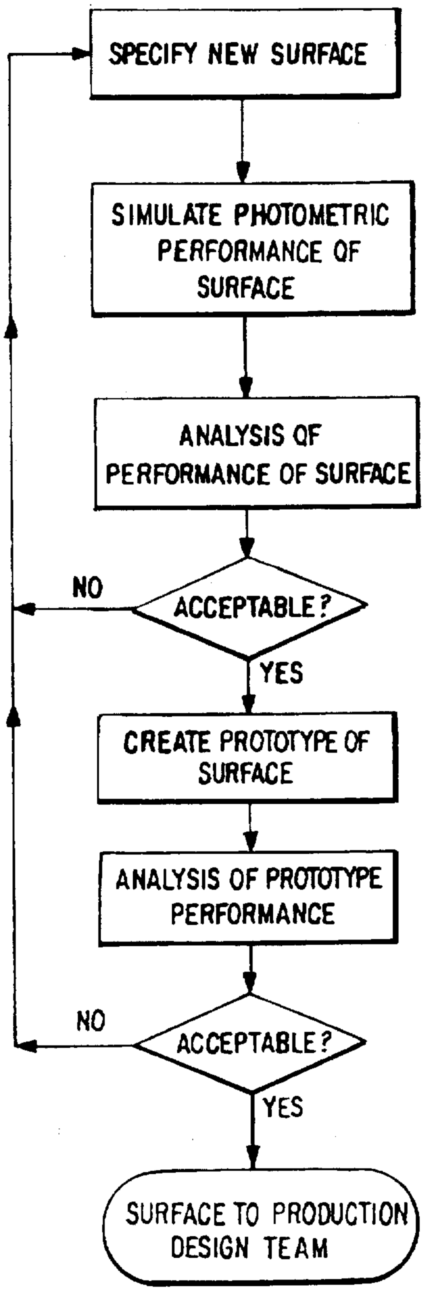
FIG. 1 (PRIOR ART)
FIG. 1 is a flow chart of a prior art optical design process.

As illustrated in FIG. 1, a known computer-assisted design process for the production of an optical element, for example a free form reflector, begins with the specification, or design of a new surface. The optical effect of that surface, such as the photometric performance of the surface, is then determined with any of several known existing computer programs. If that performance is not satisfactory, the designer specifies a new surface, and the performance is again determined. When the computer simulated performance is acceptable the next step is to produce a prototype of the element having the specified surface. The photometric pattern of the prototype is then measured, and that pattern is compared with the desired pattern, which is essentially the pattern that was predicted by the computer. Often, the pattern produced by the prototype is so different from the expected, desired pattern that the process is started again by the specification of a new surface. This is quite inefficient because of the costs for producing the prototypes and the time required. If the pattern is acceptable, however, the specifications are provided to the production team for mass production of the element.

Figure 2:
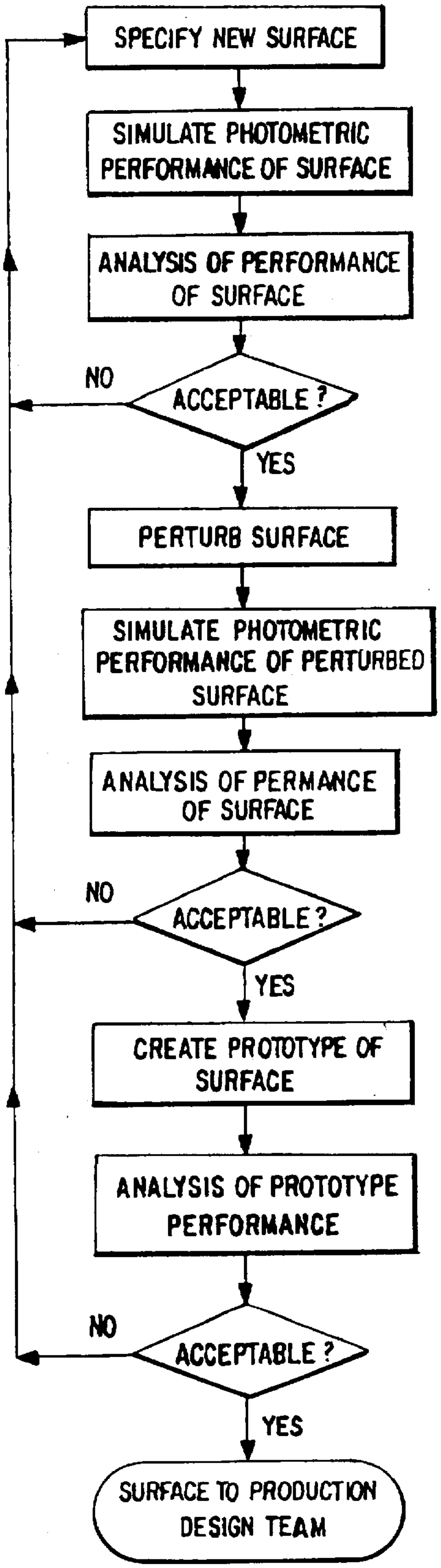
FIG. 2 is a flow chart of an optical design process in accordance with the invention.

A flow chart illustrating the preferred process in accordance with the invention is shown in FIG. 2. In accordance with this process, the first few steps are the same as in the prior art shown in FIG. 1. Thus, a new surface to produce a desired photometric performance is first specified, and the performance of the proposed surface is simulated by any of various computer programs. The performance is then analyzed and, if unsatisfactory, another surface is specified. If the performance of the new surface is satisfactory, however, it is subjected to further computer analysis in accordance with the invention.

Figure 3:
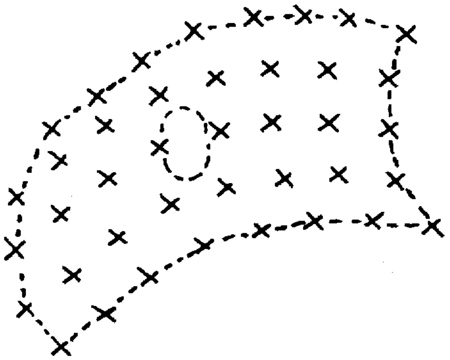
FIG. 3 is an illustration of the application of a finite element mesh to an optical element.

Manufacturing errors are simulated by mathematically modifying (perturbing) the surface, and the photometric performance of the modified surface is determined. The surface is modified by first defining a finite element mesh for the surface in accordance with known techniques. A finite element mesh in accordance with this process, illustrated in FIG. 3, defines the surface by the coordinates (e.g., x, y, z) of a large number of points on the surface. For example, the surface may be defined by an array often thousand points. Then, the position of each of these points is perturbed to simulate the effect of the manufacturing process on the surface. This perturbation is accomplished for each point by (1) generating a random number by a known random number generator and (2) adding that random number (it may be positive or negative) to the coordinate values for the particular point. The maximum and minimum values for the random numbers are specified in accordance with the particular manufacturing tolerances, and all values between these tolerances are equally probable.

Figure 4:
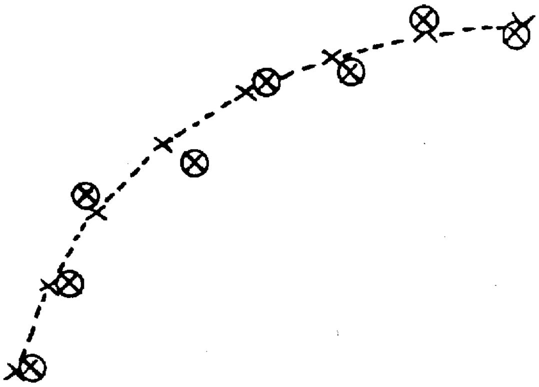
FIG. 4 is a two-dimensional illustration of the modification of the finite mesh of a surface in accordance with the invention to account for manufacturing errors.
Figure 5:
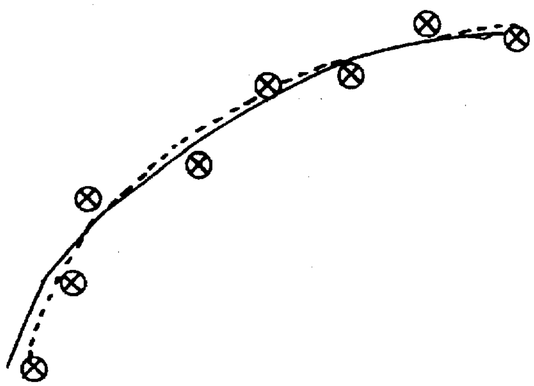
FIG. 5 is a two-dimensional illustration of the smoothing of a modified finite element mesh.

FIG. 4 illustrates the results, in two dimensions, of the mathematical perturbation of the original surface. The points denominated by "x" are points of the original surface, and the points denominated by circled "x" are points of the perturbed surface. After the positions of the various points have been modified, a new surface is determined in accordance with those points as illustrated in FIG. 5. This surface is produced by known smoothing programs.

Referring again to FIG. 2, the photometric performance of the perturbed surface is then determined. The photometric performances of the perturbed surface is analyzed to determined whether it is satisfactory. If it is, a prototype is created for physical testing as in the prior art. If the performance of the perturbed surface, which simulates the manufactured product, is not satisfactory, however, a new surface is specified, and the process is repeated.

It should be noted that, while the perturbation may result in the movement of each point in three dimensions, the preferred embodiment is for the perturbation to be applied only in one dimension. Thus, the random number generated is preferably added only to the "z" coordinate value.

In accordance with another aspect of the invention, the photometric patterns can be compared by a correlation analysis to quantify the similarities between two such patterns. For example, computer simulations to obtain data on the optical performance of a designed FFR produces an array of the form $$S_{ij}=i_{ij}\ (cd)\ i=-m, -m+1, \ldots, -1,0,1, \ldots, m-1, m$$

$$j=-n, -n+1, \ldots, -1,0,1, \ldots, n-1, n$$

with $S_{ij}$ being an intensity value in candela. The subscript "I" indicates the horizontal sample point from left (negative) to right (positive), and the subscript "j" indicates the vertical sample points from down (negative) to up (positive). The measured data of the optical performance of hardware will also have the form $$A_{ij}=i_{ij}\ (cd).\ i=-m, -m+1, \ldots, -1,0,1, \ldots, m-1, m$$

$$j=-n, -n+1, \ldots, -1,0,1, \ldots, n-1, n$$

The above notation resembles that of Donohue and Joseph. To judge the resemblance between two photometric patterns, e.g., the computer simulation data and the measured hardware data, one must first define what is meant by "similarity." For this measure of similarity it is assumed that, ideally, S and A have the form $$S_{ij}=a+bA_{ij}$$

where "a" is an intensity offset (ideally equal to zero, but due, for example, to a stray light contribution to the detector) and "b" is an intensity factor (due, for example, to the difference between assumed and actual mean spherical candela (MSCD) of the light source). This allows the use of the coefficient of linear correlation as a measure of similarity $$r=\frac{\sigma_{SA}}{\sigma_S\sigma_A}$$

where $\sigma_{SA}$ is the covariance of data A and S and $\sigma_S$, $\sigma_A$ are the standard deviations of data A and S respectively. The correlation coefficient can then be written in terms of measured values by:

$$r=\frac{\sum_{ij}(S_{ij}-S_{ave})(A_{ij}-A_{ave})}{\left[\sum_{ij}(S_{ij}-S_{ave})^2\sum_{ij}(A_{ij}-A_{ave})^2\right]^{1/2}}$$

Where $S_{ave}$ and $A_{ave}$ are the mean values for the intensities of that sample. The correlation coefficient, r, lies in the range from −1 to 1, with −1 implying a perfectly negative correlation and +1 implying a perfect correlation. The range of similarity values for these purposes should fall between 0 and 1, with the goal to be as close to 1 as possible. It must be noted that a correlation calculation should be done after an optimization routine has been performed to eliminate any rotations/misalignments between the measured data and computer simulated data. In other words, when a lamp is measured on a goniophotometer, it may not necessarily be in the same orientation with respect to the detector as the mathematical lamp geometry used in the computer simulation. These discrepancies in orientation will affect a similarity calculation and should be minimized both before data is measured (by properly aligning the hardware in the goniometer) and after data is measured (by shifting the measured data up/down and left/right).

This coefficient of correlation can be used to assist the designer in determining whether the pattern produced by the perturbed surface is sufficiently close to the pattern produced by the unmodified surface.

It will be appreciated that a new technique for the design of optical elements has been described. Modifications within the scope of the appended claims will be apparent to those of skill in the art.

We claim:

1. A method for designing an optical element to accommodate manufacturing errors comprising the steps of:

specifying a desired optical output for said element, providing input data representing the optical power of at least one optically effective part of said optical element to means for calculating the optical output of said at least one optically effective part of said optical element, determining data representing the optimum optical power of said at least one optically effective part of said optical element by comparing said optical output with said desired optical output to provide data representing the optimum optical power of said at least one optically effective part that will produce said desired optical output;

simulating errors in the manufacture of said optically effective part by modifying said data representing the optimum optical power of said optically effective part in accordance with expected manufacturing errors to obtain modified data;

ascertaining the modified optical output of said optically effective part defined by said modified data; and comparing said modified optical output with said desired optical output and determining whether said modified optical output is acceptable.

2. The method of claim 1 wherein said step of modifying the data representing the optimum optical power comprises the step of adding a random optical power differential.

3. The method of claim 1 further comprising the step of altering said data representing the optimum optical power in accordance with said modified optical output to produce data representing a modified optimum optical power of said optically effective part.

4. The method of claim 1 wherein said step of determining data representing the optimum optical power comprises the step of defining the positions of a plurality of discrete points on an optical surface.

5. The method of claim 4 wherein said step of modifying said data representing the optimum optical power comprises the step of modifying the positions of said discrete points.

6. The method of claim 5 wherein said step of modifying the positions of said discrete points comprises adding a random number to each of said positions.

7. The method of claim 6 wherein said positions are defined by three coordinates, and a random number is added to each of said coordinates.

8. The method of claim 7 wherein said positions are defined by three coordinates, and a random number is added only to one of said coordinates.

9. The method of claim 6 wherein all values of the random are equally probable between maximum and minimum numbers.

10. Apparatus for designing an optical element to accommodate manufacturing errors comprising:

means for receiving input data representing the optical power of at least one optically effective part of said optical element, means for calculating the optical output of said at least one optically effective part, means for simulating errors in the manufacture of said optically effective part by modifying said input data in accordance with expected manufacturing errors to provide modified input data representing said optically effective part after manufacture, and means receiving said modified input data for calculating the optical output of said optically effective part after manufacture.

11. Apparatus according to claim 10 wherein said means for simulating errors comprises means for adding random power differentials to said input data.

12. Apparatus according to claim 11 wherein said input data defines the positions of a plurality of discrete points on an optical surface.

13. Apparatus according to claim 12 wherein said means for simulating errors comprises means for adding a random number to said input data.

14. An optical element manufactured by the process comprising:

specifying a desired optical output for said element, providing input data representing the optical power of at least one optically effective part of said optical element to means for calculating the optical output of said at least one optically effective part of said optical element, determining data representing the optimum optical power of said at least one optically effective part of said optical element by comparing said optical output with said desired optical output to provide data representing the optimum optical power of said at least one optically effective part that will produce said desired optical output;

simulating errors in the manufacture of said optically effective part by modifying said data representing the optimum optical power of said optically effective part in accordance with expected manufacturing errors to obtain modified data;

ascertaining the modified optical output of said optically effective part defined by said modified data;

comparing said modified optical output with said desired optical output and determining whether said modified optical output is acceptable, and manufacturing said optical element in accordance with said modified data.

* * * * *